C. S. BROWN.
MOTOR AGRICULTURAL MACHINE.
APPLICATION FILED JULY 15, 1918.

1,399,739.

Patented Dec. 13, 1921.
3 SHEETS—SHEET 1.

INVENTOR
Charles S. Brown.
BY
*[signature]*
ATTORNEYS

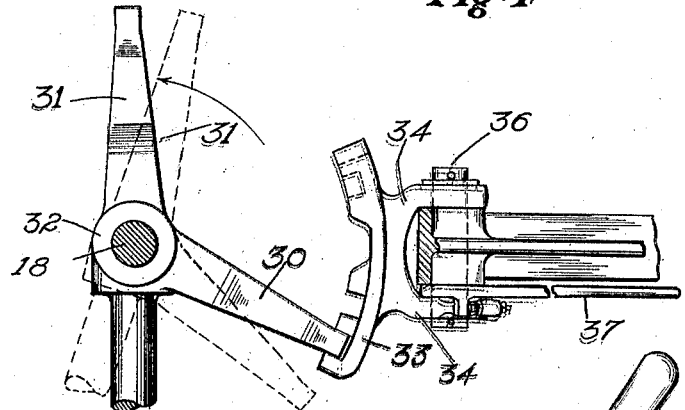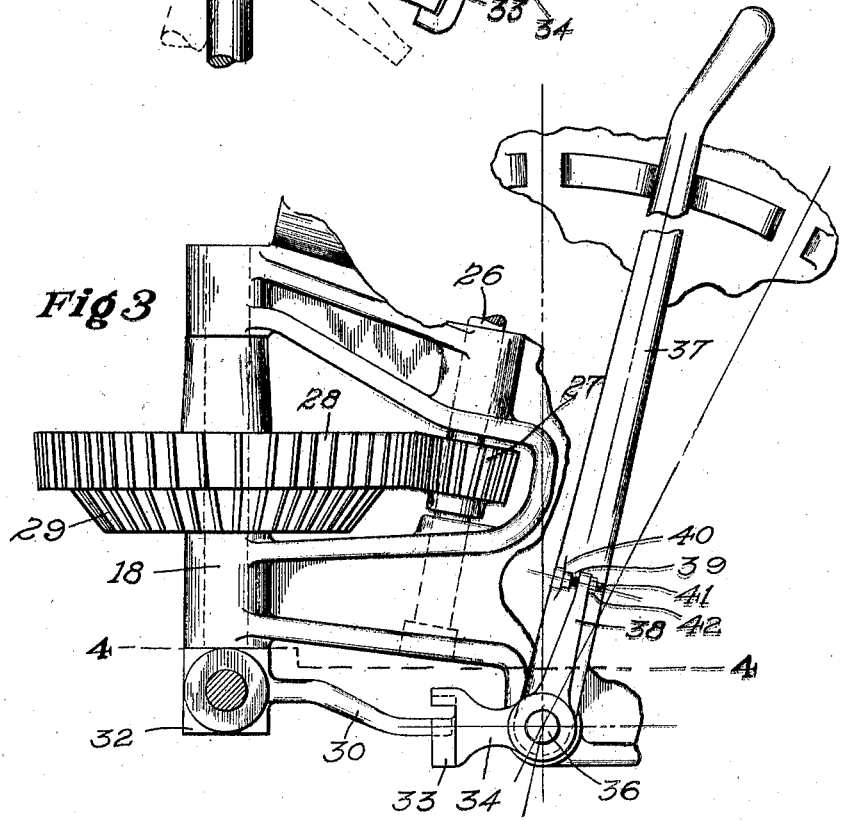

C. S. BROWN.
MOTOR AGRICULTURAL MACHINE.
APPLICATION FILED JULY 15, 1918.
1,399,739.
Patented Dec. 13, 1921.
3 SHEETS—SHEET 3.
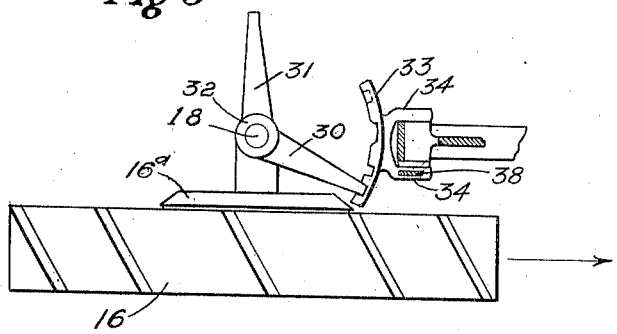
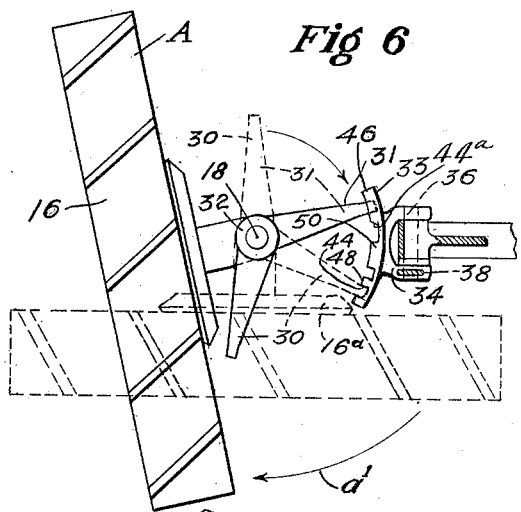
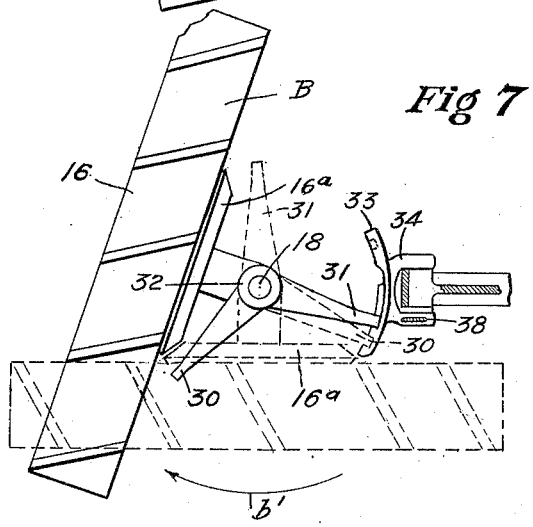
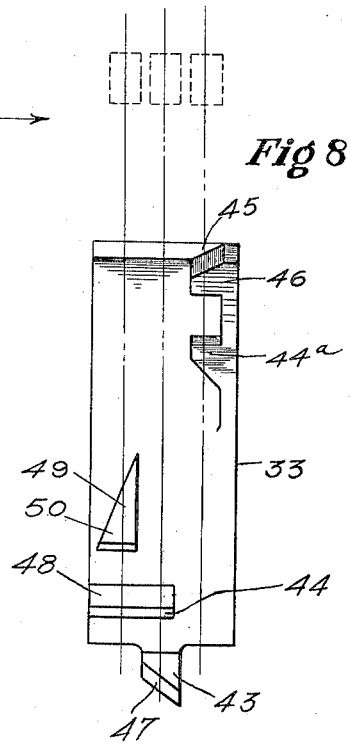
INVENTOR
Charles S. Brown.
BY
Parsons & Bodell.
ATTORNEYS

UNITED STATES PATENT OFFICE.

CHARLES S. BROWN, OF SYRACUSE, NEW YORK.

MOTOR AGRICULTURAL MACHINE.

1,399,739. Specification of Letters Patent. Patented Dec. 13, 1921.

Application filed July 15, 1918. Serial No. 245,059.

*To all whom it may concern:*

Be it known that I, CHARLES S. BROWN, a citizen of the United States, and a resident of Syracuse, in the county of Onondaga and State of New York, have invented a certain new and useful Motor Agricultural Machine, of which the following is a specification.

This invention relates to motor agricultural machines and has for its object a particularly simple, efficient and durable means for steering the machine, especially with respect to the work in the field; and the invention consists in the novel features and in the combinations and constructions hereinafter set forth and claimed.

In describing this invention, reference is had to the accompanying drawings in which like characters designate corresponding parts in all the views.

Fig. 3 is an enlarged fragmentary elevation of the means for controlling the turning of the tractor wheel about its upright axis.

Fig. 4 is a sectional view taken on the plane of line 4—4, Fig. 3, parts being omitted.

Figs. 5, 6 and 7 are plan views illustrating different turning operations of the tractor wheel.

Fig. 8 is a detail face view of the member for controlling the steering movement of the tractor wheel.

Figure 1:
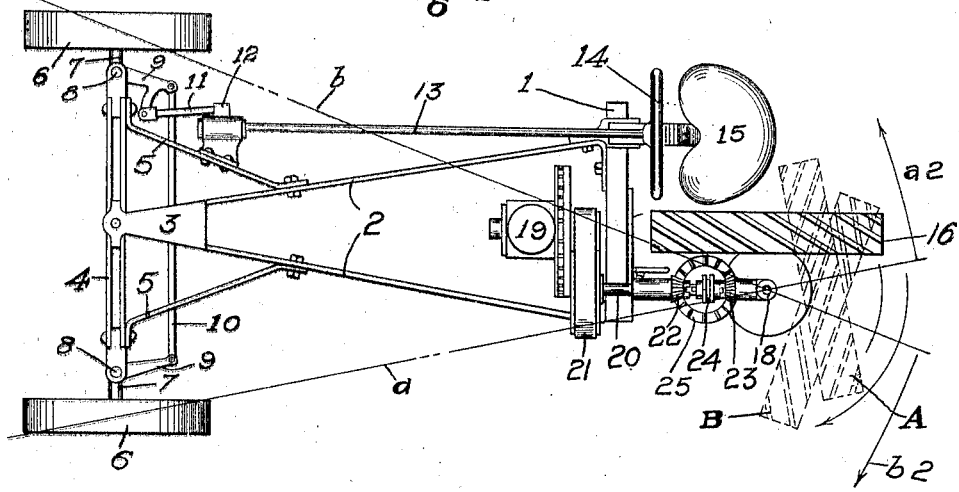
Figure 1 is a plan view illustrating one embodiment of my invention.

This machine comprises, generally, a frame, steering and driving wheels, the latter being movable about a vertical axis into different angular positions, a motor mounted on the frame, power transmitting mechanism between the motor and the driving or tractor wheel to drive the same, and means for controlling the angular position of the tractor wheel relatively to its vertical axis.

The frame may be of any suitable form, size and construction, and as here shown, comprises a main member 1, and forwardly extending converging lengthwise members 2, which are connected at their front ends to a block or casting 3 mounted on the front axle 4.

The frame as here illustrated also includes braces 5 extending from the ends of the axle 4 to the bars 2. The frame may, however, be of any other suitable construction.

6 are the steering wheels mounted on the spindles of knuckles 7 pivoted at 8 to the ends of the axle and shiftable about the axes of the knuckles 7 by means of rearwardly extending rock arms 9 which are connected together by a rod 10, one of said rock arms 9 being connected by a link 11 to a reciprocally movable part 12 operated by means of a steering post 13. A wheel 14 is mounted on the post and is located within reach of the seat 15 mounted on the main frame member 1. The motion is transmitted from the post 13 and to the part 12 in any suitable manner as by a worm and nut steering gear. The wheels 6 are thus operable for steering purposes by means of the wheel 14, and are locked against movement by reason of the self-locking action of the steering gear. The steering wheels are preferably at the front end of the machine.

16 designates the tractor wheel which is located to travel in a line between the steering wheels 6, this wheel 16 being shiftable about an upright axis 18 into different angular relations to the axis 18 into position indicated in dotted lines at A and B, Fig. 1, and in full lines, Figs. 6 and 7 in which the axis of said wheel is substantially coincident with the radial lines $a$, $b$, passing substantially through the vertical centers or diameters of the left and right front wheels of the machine.

Figure 2:
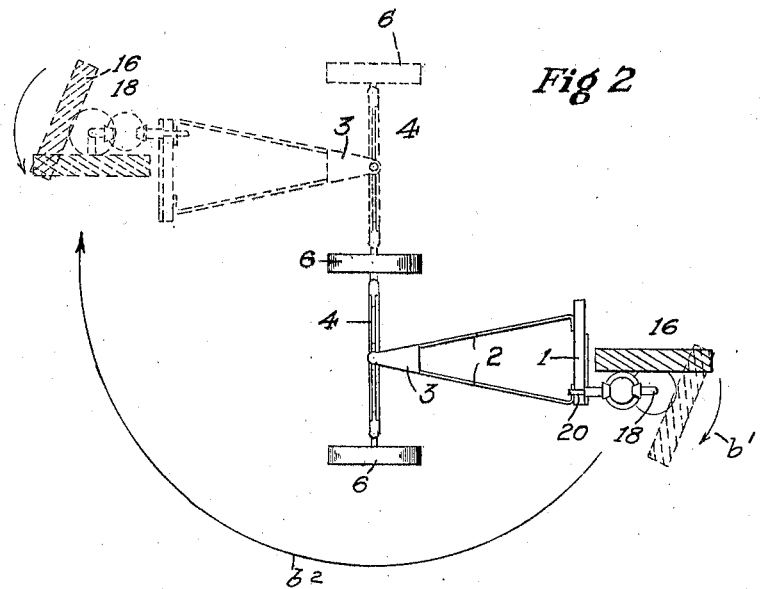
Fig. 2 is a diagrammatic view illustrating one of the turning operations of the machine.

When the tractor wheel is in either one of the positions as for instance, as shown in dotted lines, Fig. 2, in which it is radial with the vertical center or diameter of the right hand steering wheel 6 of the machine, rotation of the tractor wheel to the left in the direction of the arrow $b^1$, Fig. 2 will cause the machine to turn in the direction of the arrow $b^2$ on the radius $b$ about the vertical center of said right hand steering wheel, from the position shown in full lines to that shown in dotted lines in Fig. 2, as the front steering wheels are locked from turning movement by the self-locking steering mechanism. Of course, the steering wheels 6 may, if desired, be moved by hand to obtain a different turning movement.

19 designates the motor which may be of any suitable form, size and construction. The power transmitting means between the motor and the tractor comprises a shaft 20 suitably supported in the frame and connected to the crank shaft of the engine in any suitable manner as by a belt $21^a$, a pair of bevel gears 22, 23 loosely mounted on the shaft 20 and clutched thereto by a clutch 24 slidable from a neutral position forwardly and rearwardly to connect either one of the gears 22, 23 to said shaft, and a gear 25, Fig. 1, mounted on a shift 26 having a gear 27 thereon meshing with a gear 28, provided with a bevel gear 29 on the lower side thereof meshing with a gear ring 16ª on the tractor wheel 16.

Assuming that the shaft 20 turns to the right, when the gear 22 is locked to the shaft 20, the tractor wheel will be driven forwardly when the gear 22 is clutched to the shaft 20 and rearwardly when the gear 23 is clutched thereto. Also turning of the tractor wheel rearwardly shifts it from its normal or straight position into one of the positions A, B indicated in dotted lines in Fig. 1, and this shifting movement is normally prevented and the wheel is locked in either its normal or its shifted positions by controlling means to be presently described. Turning of the tractor wheel forwardly shifts the wheel when unlocked from the positions A, B to its normal position. The movement of the tractor wheel about its axis 18 is due to the gears 29, 16ª.

The controlling means comprises arms 30 and 31 extending substantially radially from a hub 32 mounted on the axis or shaft 18, a shiftable locking member coating with said arms, and means for shifting the locking member.

33 designates the locking member which is here shown as an arc-shaped plate concentric with the axis 18, said plate having arms 34 rigid therewith which are mounted on a shaft 36 journaled in a bearing in the frame. The arms 34 are rocked by means of a lever 37 mounted on the shaft 36 and having three angular positions. When the lever 37 is in its central position, the tractor wheel is straight or normal and when in one or the other of the remaining positions said wheel is in one of its angular positions A, B, Fig. 1.

The lever 37 is connected to the arm 34 by a lost motion connection in order to permit ratcheting action of the locking member 33, and as here shown, one arm 34 is provided with a radial upwardly extending arm 38 having an adjustable stop 39 at its upper end coacting with a fixed shoulder 40 carried by the arm 37 in the rear of the shoulder 39. The shoulder 39 is the head of a screw 41 threading into the arm 37 and held in its adjusted position by a nut 42.

The locking plate 33 has shoulders 43, 44, 48, 50 arranged to coact with the arms 30, 31 to stop the turning movement of the tractor about its vertical axis 18 when the locking member is shifted into different angular positions by the handle 37. The arm 30 is engaged with a shoulder 43 of the plate when the tractor wheel 16 is normal or straight and the operating member in its central position, said arm 30 having its end interposed between the shoulders 43, 44 and bearing on the shoulder 44 when the machine is traveling forward and against the opposing face of the shoulder 43 when the machine is traveling rearwardly. Upon movement of the operating lever out of central position either forwardly or rearwardly as for instance, rearwardly, the locking member or plate 33 is moved downwardly carrying the shoulder 43 out of engagement with the arm 30 whereupon the tractor wheel 16 (assuming that the reverse gear 23 is locked to the shaft 20) will move rearwardly about its vertical axis 18 from the position shown in Fig. 5 to that shown in Fig. 6 in which the arm 31 is stopped by the shoulder 44ª and is between the shoulders 44ª, 46.

This movement of the handle lever 37 also places the shoulder 44ª in the path of the arm 31 so that as the tractor wheel 16 turns rearwardly about its axis 18 in the direction of the arrow a', Fig. 6, the arm 31 will move into engagement with the shoulder 44ª, and thus hold the tractor wheel in its angular position A, Fig. 6 and dotted lines, Fig. 1, the arm 31 engaging a ratcheting surface 45 on the shoulder 48 in advance of the shoulder 44ª preliminary to engaging the shoulder 44ª, said surface 45 causing the locking member 33 to ratchet so that the arm 31 latches into the socket between the shoulders 44ª and 46.

Upon reversing of the rotation of the tractor wheel 16 in this position by shifting the clutch 24 to release the gear 23 and clutch gear 22 to the shaft 20 so that the wheel rotates forwardly, the wheel will rotate forwardly and the machine will turn about the radius a, Fig. 1 of the front left hand steering wheel in the direction of the arrow a² Fig. 2. When the turning of the machine is completed, the lever 37 is again shifted to central position so that the tractor wheel 16 swings from the position illustrated in full lines, Fig. 6 back into normal position without operating the clutch 24, the arm 30 engaging the ratcheting face 47 of the shoulder 43 causing the locking member to again ratchet into engagement with said arm 30 to hold the tractor wheel 16 normal.

Movement of the lever 37 forwardly from its central position causes the locking member or plate 33 to move upwardly to release the arm 30 from the shoulder 43 and carry the shoulder 48 into the path of the arm 31, the arm 31 engaging the ratcheting surface 49 on a shoulder 50 in advance of the shoulder 48 preliminary to entering the space between the shoulders 48 and 50.

When the handle is thus shifted forwardly and the clutch 24 operated to connect the gear 23 with the shaft 20, the tractor wheel 16 turns about its vertical axis 18 as indicated by the arrow b', Figs. 2 and 7, and is limited in its position B, Figs. 1 and 7. Now, without shifting of the clutch 24 the machine moves in the direction of the arrow $b^2$ Figs. 1 and 2 on the radius $b$ of the right hand steering wheel of the machine until the machine occupies a position at a right angle to its former position whereupon the lever 37 is again moved to its central position and the clutch 24 shifted so that the tractor wheel 16 rotates forwardly and moves from its position B, Fig. 1, back to normal position, the arm 30 ratcheting in engagement with the shoulder 43 as before, the shoulder 48 which is of double width sliding along the arm 31 until the shoulder 50 passes below the arm 31 so that the arm 31 is released from the locking member 33.

The lost motion between the stop shoulders 39, 40 permit ratcheting action of the locking member 33.

All of these various movements can be modified by operating the steering wheels if desired.

What I claim is:

1. In a motor vehicle, the combination of a frame, a pair of steering wheels near one end of the frame, a tractor wheel near the other end of the frame and traveling in a path between the paths of the steering wheels, the tractor wheel being also shiftable about an upright axis from normal position into angular positions with its horizontal axis arranged radially relatively to the vertical diameter of one or the other of the steering wheels, a motor carried by the frame, and mechanism between the motor and the tractor wheel to drive and to shift the same, and means for controlling the shifting of the tractor wheel, substantially as and for the purpose described.

2. A motor vehicle comprising a frame, a pair of steering wheels near one end of the frame, a tractor wheel near the other end of the frame and traveling in a path between the paths of the steering wheels, the tractor wheel being shiftable about an upright axis from normal position into angular positions with its horizontal axis arranged in a line radial to its upright axis and also radial to a vertical diameter of one or the other of the steering wheels, a motor carried by the frame, mechanism between the motor and the tractor wheel to drive and to shift the same, and means for controlling the shifting of the tractor wheel, substantially as and for the purpose specified.

3. A motor vehicle comprising a frame, a pair of front wheels and a rear tractor wheel shiftable about an upright axis from normal position into a position in which its axis is coincident with a radius extending through the vertical diameter of one of the front wheels, a motor carried by the frame, mechanism between the motor and the tractor wheel to drive and shift the same, and means for controlling the shifting of the tractor wheel, substantially as and for the purpose set forth.

4. A motor vehicle having a pair of front wheels and a rear tractor wheel located in a line extending between the front wheels and shiftable about an upright axis from normal position into an angular position in which its axis is coincident with a radius extending substantially through the vertical diameter of one of the front wheels, a motor for driving the tractor wheel, and means for controlling the shifting of the tractor wheel, substantially as and for the purpose described.

5. A motor vehicle having a pair of wheels and a tractor wheel shiftable about an upright axis from normal position into a position in which its axis is coincident with a radius extending through the vertical center of either one of the pair of wheels, a motor for driving the tractor wheel, and means for controlling the shifting of the tractor wheel into and out of its angular positions relatively to its upright axis, substantially as and for the purpose specified.

6. A motor vehicle having a pair of front wheels, and a rear tractor wheel located in a line extending between the front wheels and also shiftable about an upright axis from normal position into an angular position in which its axis is coincident with a radius extending substantially through the vertical diameter of either one of the pair of wheels, a motor for driving the tractor wheel, and means for controlling the shifting of the tractor wheel into and out of its angular positions relatively to its upright axis, substantially as and for the purpose set forth.

7. In a motor vehicle, a pair of steering wheels, means for steering the same, a tractor wheel having a shifting movement about an upright axis into an angular position in which it is arranged with its axis substantially radial with the vertical diameter of one of the former wheels, mechanism for driving and shifting the tractor, and means for controlling the movement of the tractor by said mechanism into and out of its angular positions relatively to its upright axis, substantially as and for the purpose described.

8. In a motor vehicle, a tractor wheel shiftable about a vertical axis into different angular positions relatively to said vertical axis, mechanism for driving the tractor wheel and tending to turn the same about its vertical axis, and means for locking the tractor wheel in its angular positions comprising rock arms substantially radial with the vertical axis of the wheel, and a member coacting with said arms and having a plurality of shoulders for engaging said arms, said member having a ratcheting movement, and means for shifting said member to release the arms therefrom, substantially as and for the purpose described.

9. In a motor vehicle, a tractor wheel shiftable about an upright axis into different angular positions relatively to said upright axis, mechanism for driving the tractor wheel and tending to turn the same about its upright axis, means for locking the tractor wheel in different angular positions comprising rock arms substantially radial with said upright axis, a locking plate having shoulders arranged in different paths, the locking plate being shiftable to carry different shoulders into alinement with said arms, and means for operating said plate, substantially as and for the purpose specified.

10. In a motor vehicle, a tractor wheel shiftable about an upright axis into different angular positions relatively to said upright axis, mechanism for driving the tractor wheel and tending to turn the same about its upright axis, means for locking the tractor wheel in different angular positions comprising rock arms radial with said upright axis and a plate having shoulders arranged in different paths, the locking plate being shiftable to carry different shoulders into alinement with said arms, an operating lever for shifting the locking plate and a lost motion connection between the lever and the plate for permitting the plate to ratchet, substantially as and for the purpose set forth.

In testimony whereof, I have hereunto signed my name, at Syracuse, in the county of Onondaga, and State of New York, this 5th day of July, 1918.

CHARLES S. BROWN